(12) United States Patent
Waldburger

(10) Patent No.: US 9,713,314 B2
(45) Date of Patent: Jul. 25, 2017

(54) PRESS COVER FOR A CHEESE MOULD

(71) Applicant: Kalt Maschinenbau AG, Lütisburg (CH)

(72) Inventor: Peter Waldburger, Niederbüren (CH)

(73) Assignee: KALT MASCHINENBAU AG, Lütisburg (CH)

( * ) Notice: Subject to any disclaimer, the term of this patent is extended or adjusted under 35 U.S.C. 154(b) by 327 days.

(21) Appl. No.: 14/644,323

(22) Filed: Mar. 11, 2015

(65) Prior Publication Data

US 2015/0257358 A1 Sep. 17, 2015

(30) Foreign Application Priority Data

Mar. 11, 2014 (CH) .......................................... 362/14

(51) Int. Cl.
*A01J 25/15* (2006.01)
*A01J 25/13* (2006.01)

(52) U.S. Cl.
CPC ............... *A01J 25/15* (2013.01); *A01J 25/13* (2013.01)

(58) Field of Classification Search
CPC ............. A01J 25/12; A01J 25/13; A01J 25/15
See application file for complete search history.

(56) References Cited

U.S. PATENT DOCUMENTS

| 4,440,073 A | * | 4/1984 | Quilliou | ................... | A01J 25/15 100/110 |
| 4,509,413 A | | 4/1985 | Granberg et al. | | |
| 5,206,496 A | | 4/1993 | Clement et al. | | |
| 6,026,737 A | * | 2/2000 | D'Alterio | ................ | A21B 5/00 425/394 |

FOREIGN PATENT DOCUMENTS

| BR | 9300409 | 9/1993 |
| CH | 704208 | 6/2012 |
| DE | 1030612 | 5/1958 |
| DE | 2823182 | 12/1978 |
| EP | 0126861 | 12/1984 |
| EP | 0350777 | 1/1990 |

(Continued)

OTHER PUBLICATIONS

European Search Report dated Jul. 14, 2015 for European Application No. 15158045.

*Primary Examiner* — James Sanders
(74) *Attorney, Agent, or Firm* — Paul D. Bianco; Katharine Davis; Fleit Gibbons Gutman Bongini & Bianco PL

(57) ABSTRACT

The invention relates to a press cover for a cheese mold, particularly for a cheese mold (1, 12) made from metal with a round or polygonal cross section, wherein the shape and dimensions of the press cover (1) match the inner cross section of the cheese mold (1). It should be of simple construction, able to withstand high pressing force, and also satisfy stringent hygiene requirements. This is solved in that the press cover (1) comprises a perforated plate (22) and a frame (30) with is provided on the periphery of the press cover (21), which frame has a movable outer ring (33) arranged on the outside thereof, which ring lies flush against the inner wall of the cheese mold (1, 12) and creates an effective seal therewith when the raw cheese mass is pressed out. The press cover (21) is also provided with a stiffening frame and rib structure (23, 24, 30).

8 Claims, 6 Drawing Sheets

(56) References Cited

FOREIGN PATENT DOCUMENTS

| EP | 0406899 | 1/1991 |
| EP | 0543185 | 5/1993 |
| EP | 0543899 | 6/1993 |
| EP | 1269832 | 1/2003 |
| FR | 2527421 | 12/1983 |
| NL | 8402355 | 2/1986 |
| WO | 92/03297 | 3/1992 |

* cited by examiner

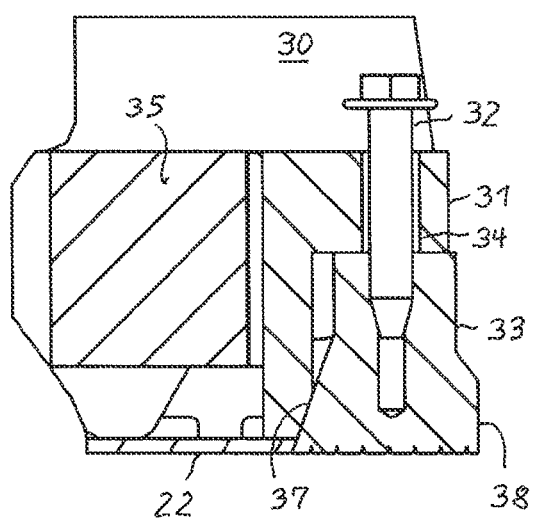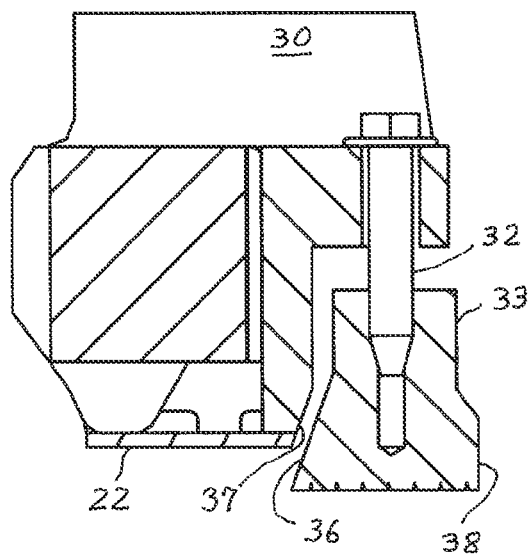

PRESS COVER FOR A CHEESE MOULD

FIELD OF THE INVENTION

The invention relates to a press cover for a cheese mould, particularly for a cheese mould made from metal with a round or polygonal cross section, which in turn is arranged inside a cassette press or the like.

BACKGROUND

A device for the industrial production of cheese blocks is known for example from EP-A-350777. This comprises a wash-in press having a rectangular trough which is open at the top for receiving moulds, a pedestal frame for arranging a press head that can be lowered and raised, and a distribution head for feeding and metered dispensing of the raw cheese mass into the moulds, and a gantry carriage that is displaceable on the trough for guiding the distribution head and handling a turning mechanism for the moulds. The distribution head and the turning mechanism must be provided and changed manually. The wall of the mould consists of a perforated plate and multiple moulds can be arranged in sets. Cylindrical pins are provided on the end faces of a set for docking a handling apparatus.

EP-A-406899 describes a further development of such a device, in which the moulds are accommodated in cassettes, and the cassettes are in turn arranged in compact rows in the trough. A press head having press dies directed at the cheese moulds for pressing the raw cheese mass is provided above the moulds.

In this case, the actual press mould is surrounded by a pot-like jacket with an air supply duct (EP-B-1269832). In this way, an air channel is formed, and the cheese mass sticking to the screen holes in the perforated plate can be removed from the side of the mould by the air through after pressing.

According to EP-B-543185, a mould cover can be connected to the press die in self-centring manner via a tilting apparatus, so that the mould cover is prevented from being sucked against the cheese mass as a result of possible tilting movements. The mould itself is round or rectangular and can consist of an outer container and an inner, perforated liner.

Another cheese mould with a perforated metal mould wall is disclosed in DE-B-1030612. This mould wall has low raised areas and depressions up to about 1 mm deep distributed evenly over its inner surface, designed to ensure that the cheese rind is not damaged when the cheese block is removed, even if the cheese is knocked out of the mould.

According to DE-C-2823182, such a cheese mould with perforated wall may be made from plastic, the inner side of which is provided with parallel grooves having a triangular cross section. In the transitional and integral base area, the grooves are separated by discontinuous ribs.

Mould walls or double bases of such kind require significant effort to clean.

SUMMARY OF THE INVENTION

A press cover for a cheese mould, particularly a cheese mould made from metal, that is suitable for mounting on the press head of a cassette press or the like, which is of simple construction, can withstand high pressing force, and also satisfies stringent hygiene requirements is disclosed.

A press cover according to the invention consists essentially of a perforated plate, the shape and dimensions of which match the inner cross section of a cheese mould, and a strengthening frame and rib structure positioned over it, which lends the necessary rigidity to the press cover. An outer ring, preferably a plastic ring, which is movable on the outside of a frame, is arranged on the periphery of the press cover, and when pressure is exerted on said ring it creates an effective seal with respect to the inner wall of the cheese mould. The press cover according to the invention not only enables the whey able to drain away freely, but it is also easy to clean completely from both sides. It is particularly suitable for squeezing heavily pressed cheese, i.e., hard cheese.

Such hard-pressed cheese requires pressing times of up to about 18 hours at a relatively high pressing temperature. During this process, it is important to prevent strands, shavings or hardened regions of the pressed cheese mass, as these are difficult to remove.

In contrast, previously known press covers consist for example of a rigid cover plate made of steel, the shape and dimensions of which match the inner cross section of a cheese mould, and a thin perforated sheet arranged on the underside of the cover plate. The cover plate also comprises a number of relatively large openings to allow the whey to flow drain away when the raw cheese mass is being pressed.

It is possible for whey and cheese residue or other contaminants to build up in the unperforated areas of the cover plate, such deposits being unseen and difficult to remove.

Preferred configurations are disclosed in the dependent claims.

The outer ring or plastic ring is arranged on the underside of a ring guide so that it can be raised or lowered in the guide. A guide surface is arranged at an angle to the pressing direction, so that the outer ring is movable vertically without tilting and is able to lie flush against the inner wall of the cheese mould to create a seal with a protruding edge. When the press cover is lifted, the outer ring can again slide downward in the guide, which enables the press cover to be separated from the inner wall of the cheese mould more easily, and also means that the circumferential region of the press cover can be cleaned effectively.

During the pressing operation, the underside of the outer ring is essentially in flush contact with the perforated plate.

The outer ring may also be constructed in segments.

The rib structure is connected non-detachably to the perforated plate by thin bars. The perforated plate and the rib structure are preferably made from stainless steel.

The perforated plate is preferably a finely perforated plate, particularly made from CONIDUR®, the rib structure is made from stainless steel. The apertures in the perforated plate are preferably about 0.1 mm wide and about 0.3 mm long.

In round cheese moulds, individual ribs pass in the manner of struts across the central point, preferably extending in a radiating or radial manner from the lengthwise axis of the mould, across the perforated plate to the periphery. In this way, they intersect with transverse ribs arranged in a ring pattern, and are connected therewith, so that multiple rings with various diameters may be provided with a separating distance between each.

In the case of polygonal and also round cheese moulds, struts parallel to the outer edges are also possible instead of the rings.

The rib structure also comprises upwardly facing eyelets or the like, which enable the press cover, for example, to be positioned on a press head.

The wall of the cheese mould itself is constructed as a single part and is provided with a rib structure on the outer wall preferably in the transition and base area.

The rib structure may be used in both round and angled moulds with corresponding adaptations.

In round moulds, individual ribs extend preferably in radiating or radial manner, originating from the lengthwise axis of the mould and passing across the base as far as the area of the peripheral wall, or also as far as the upper edge of the peripheral wall. The ribs in the base area are preferably connected with transverse ribs arranged in rings, wherein multiple rings with different diameters may be provided at a distance from each other. However, according to another embodiment, the ribs may also be arranged parallel to each other.

In rectangular moulds, ribs are arranged at least parallel to each other, wherein further transverse ribs, may be provided that are also parallel to each other.

The strength and stability of the cheese mould are increased, the base can be inspected visually, particularly with regard to hygiene and cleaning. Consequently, the previously usual double wall of the base may be dispensed with, as a result of which it is also no longer necessary to blow air in to detach the cheese block.

The ribs are dimensioned such that the outer dimensions of existing cassettes for accommodating cheese moulds may remain unchanged.

BRIEF DESCRIPTION OF THE DRAWINGS

In the following, the invention will be described in greater detail with reference to an embodiment. In the drawing:

FIG. 5: shows an outer ring of the press cover of FIG. 2 or 4, FIG. 6: shows the outer ring of FIG. 5 in the fully lowered position.

DETAILED DESCRIPTION OF THE INVENTION

Figure 1:
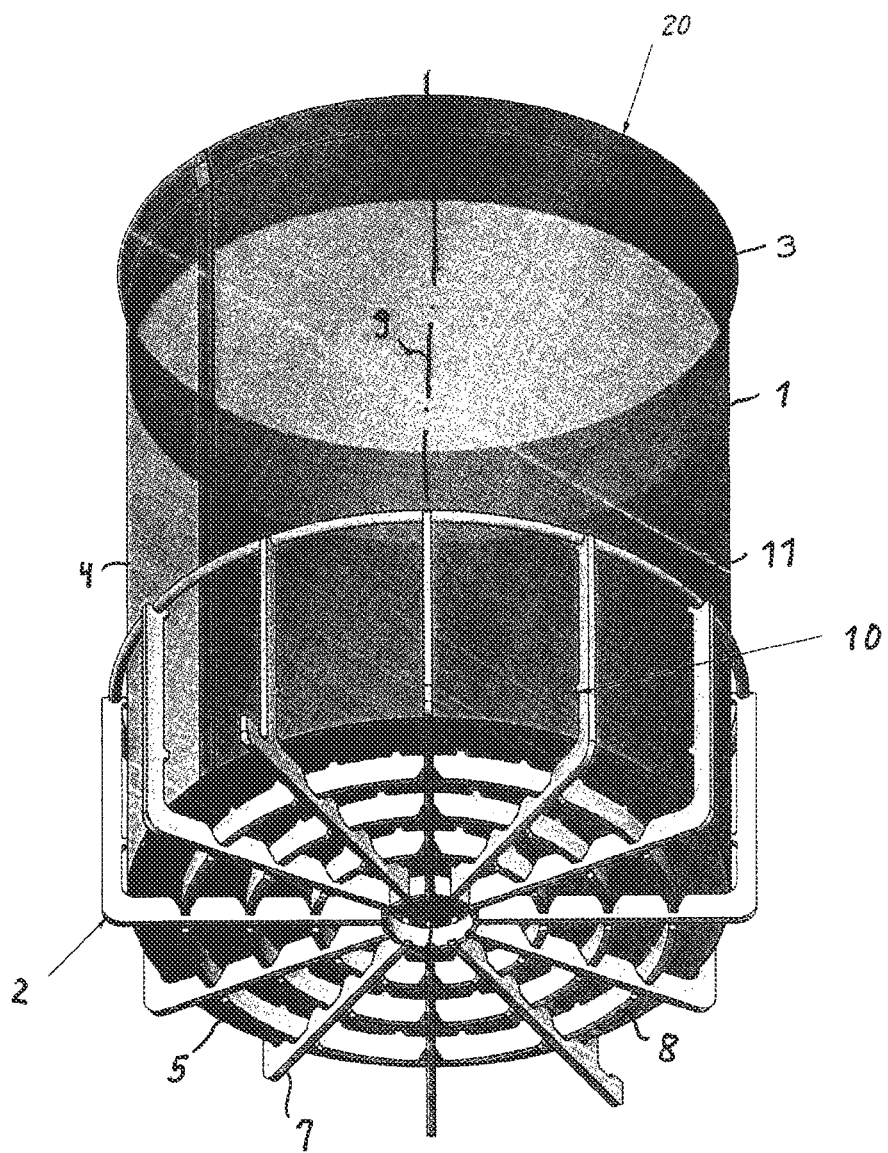
FIG. 1: shows a round cheese mould.

A press cover 21 (FIG. 2) according to the invention for a round cheese mould 1 consists of a perforated plate 22, preferably a finely perforated plate, made from CONIDUR®, for example, which is surrounded in the peripheral area by a frame 30 having an outer ring 33 in the form of a plastic ring, and the shape and dimensions of which match the inner cross section of cheese mould 1. It further consists of a reinforcing rib structure 23, 24 made from a stainless steel and positioned thereon, which lends press cover 21 the necessary rigidity for pressing out the whey. Rib structure 23, 24 is connected non-detachably, particularly welded, to perforated plate 22 by thin bars 26.

Figure 2:
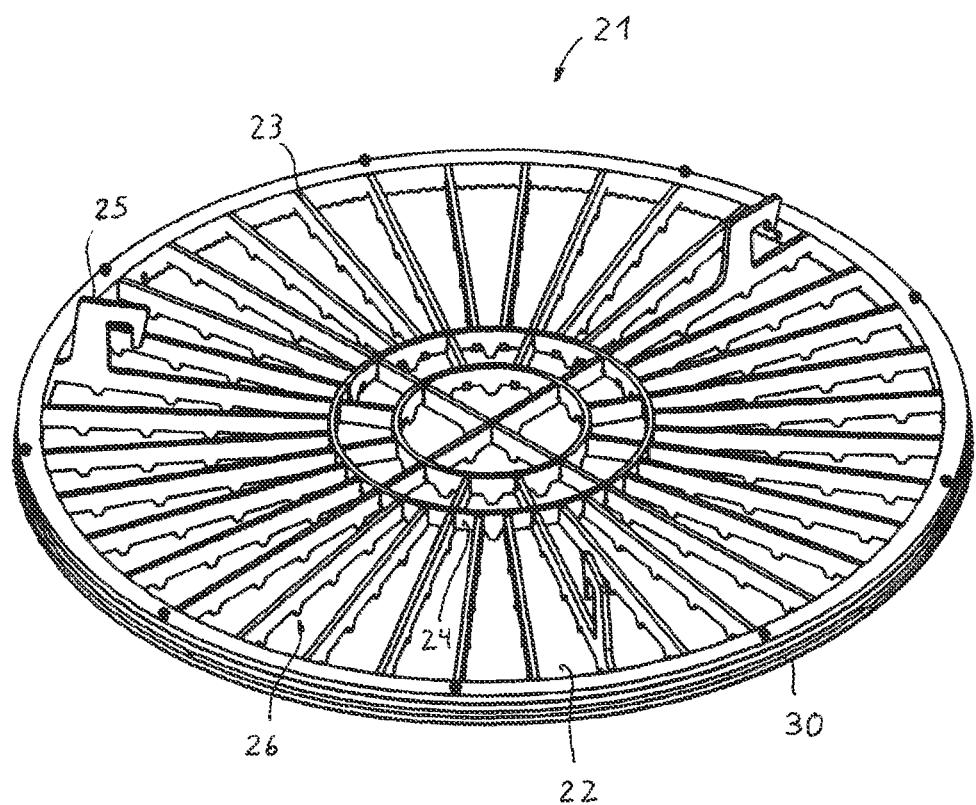
FIG. 2: shows a press cover according to the invention for a round cheese mould.
Figure 4:
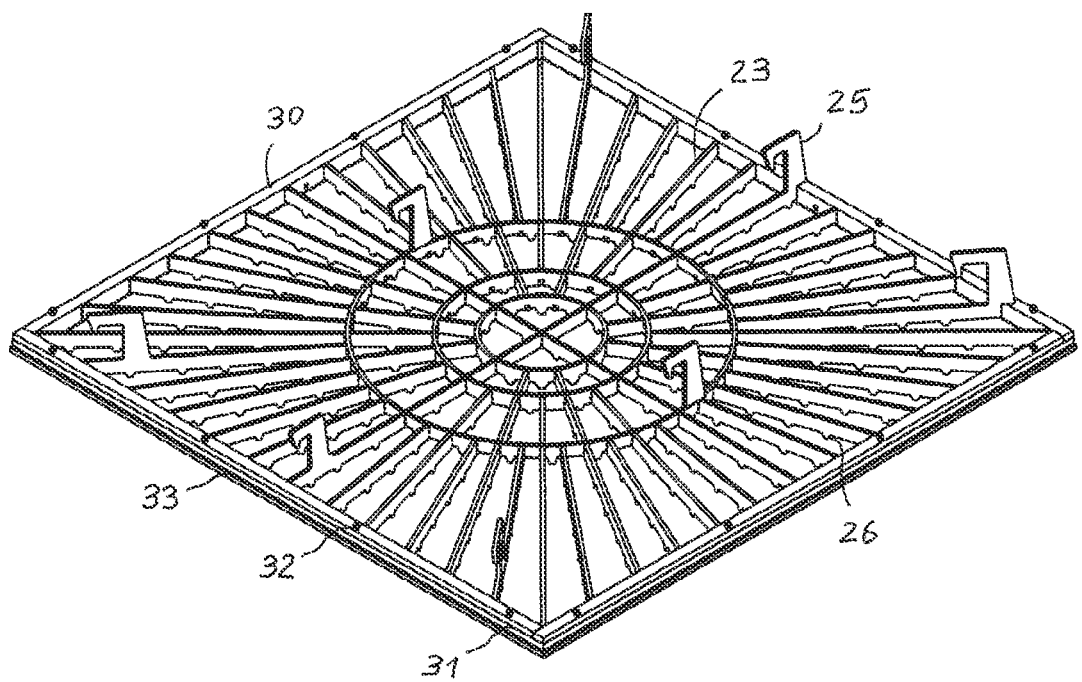
FIG. 4: shows a press cover according to the invention for a rectangular cheese mould.

In round cheese mould 1, individual ribs in the form of struts 23 pass over the centre point extending preferably in radiating or radial manner from the lengthwise axis of the mould over perforated plate 22 as far as frame 30 (FIG. 2). In so doing, they intersect with rings or transverse ribs 24 positioned in a ring arrangement, and are attached thereto at the intersection points, wherein multiple rings with different diameters may be provided with a separating space therebetween. Rectangular press mould covers 21 have a similar structure, adapted to accommodate the basic shape (FIG. 4).

The outer ring 33 or plastic ring is arranged on the underside of a ring guide 31 such that it may be raised and lowered in frame 30. A guide surface 37 of ring guide 31 is arranged at an angle to the pressing direction, so that outer ring 33 is movable vertically without tilting and is able to lie flush against the inner wall of cheese mould 1, 12 to create a seal with a protruding edge 38. Outer ring 33 is furnished with a corresponding surface 36 to guide surface 37, which is also at the same angle. In addition, bolts 32 are arranged at distance from each other in outer ring 33, and are aligned in guide holes that are approximately parallel to the pressing direction.

When the raw cheese mass is pressed out, the underside of outer ring 33 lies flush with perforated plate 22 (FIG. 5).

A protruding edge 38 is provided on the outside of outer ring 33, which edge serves to create a good seal with the inner wall of cheese mould 1, 12 during pressing.

When press cover 21 is raised, outer ring 33 may in turn slide downward in the guide (FIG. 6), which not only enables press cover 21 to be detached from the inner wall of cheese mould 1, 12 more easily, but also ensures the peripheral region of press cover 21 can be cleaned effectively. Upon raising, outer ring 33 drops approximately 3 mm, and a gap 39 is formed, which can then be rinsed easily. This dropping motion also gives rise to a self-cutting effect with respect to the cheese surface.

Figure 3:
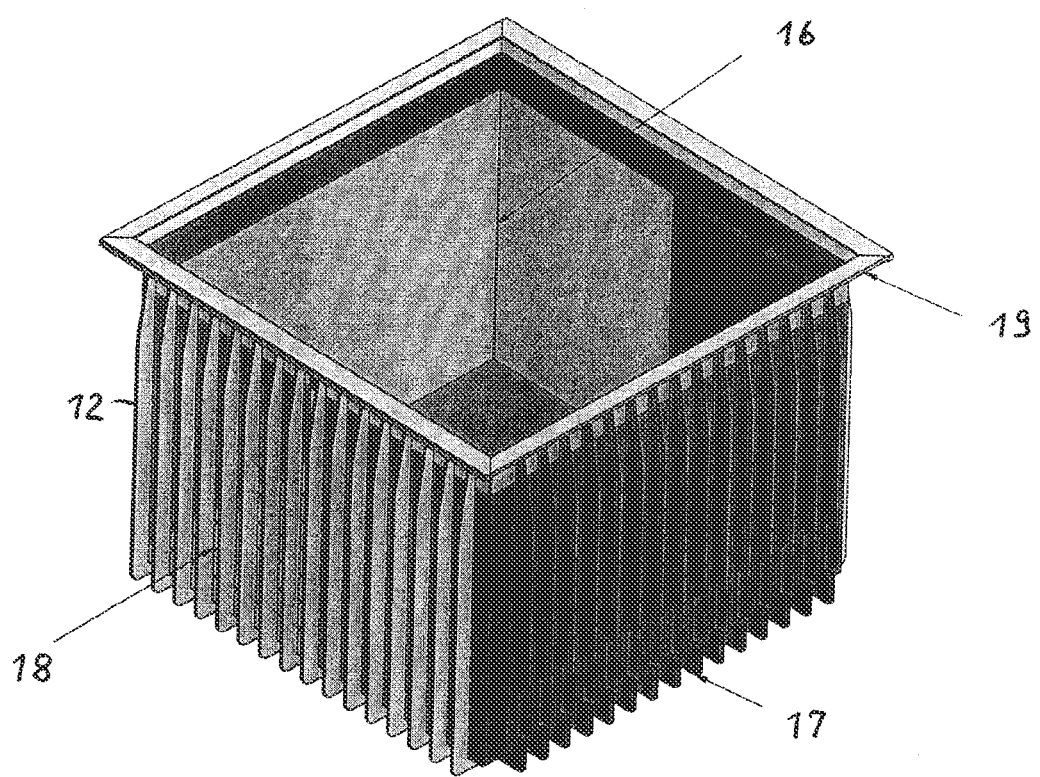
FIG. 3: shows a rectangular cheese mould.

Cheese moulds 1, 12 according to the invention (FIGS. 1 and 3) made from metal, particularly a stainless steel, are suitable for use in known cassette presses (not shown). Such a cassette press is used in known manner for liquid-reducing pressing of raw cheese mass and comprises a trough, which is rectangular when viewed from above and open at the top, having cassettes, which are rectangular when viewed from above and open at the top, and are arranged side by side in rows transversely to the longitudinal direction of the trough, round or rectangular cheese moulds for receiving the raw cheese mass to be pressed, which are arranged in the cassettes and have at least one base and an outer case with at least one outlet for the liquid that is to be pressed out, wherein one cassette holds at least one mould 12, and at least the base of mould 12 is provided with a rib structure, and wherein the cheese moulds may also be part of the cassette, a press head mounted on end columns and having a multiplicity of press dies, which are directed at the cheese moulds for pressing the raw cheese mass, e.g. configured according to the disclosure of EP-B-543899 or CH 704208 A, and optionally holders for pressing the press head off the cassettes, a pipe distribution system or a filling machine for filling cheese moulds 12 with the raw cheese mass, at least one handling apparatus, which is movable along the longitudinal sides of the trough, for lifting, moving and depositing a cassette on a conveyor apparatus outside the trough, an apparatus for rotating/turning the cassette or row of cassettes about the longitudinal axis thereof.

A spring-mounted shaking mechanism positioned horizontally above the conveyor apparatus, in the form of a tenter frame for example, may preferably also be assigned to the cassette press for receiving a cassette. The cheese blocks are not emptied onto the conveyor apparatus until shaking has been carried out.

A round mould 1 according to FIG. 1 comprises a cylindrical jacket 4 with an upper basket 3 and a base 5, which is provided with rib structure 2 as far as the transition region of the outer jacket wall.

Longitudinal ribs 7 extend radially, originating from lengthwise axis 9 and passing across base 5 and continuing as jacket ribs 10 into the region of the jacket wall. The ends of jacket ribs 10 are welded to a jacket ring 11. Longitudinal ribs 7 are connected to rings 8 in a material and/or form-fitting manner in the base region, wherein a plurality of rings 8 having different diameters and positioned at a distance from each other are provided. An inner ring 8 delimits the extent of longitudinal ribs 7 towards lengthwise axis 9.

Figure 7:
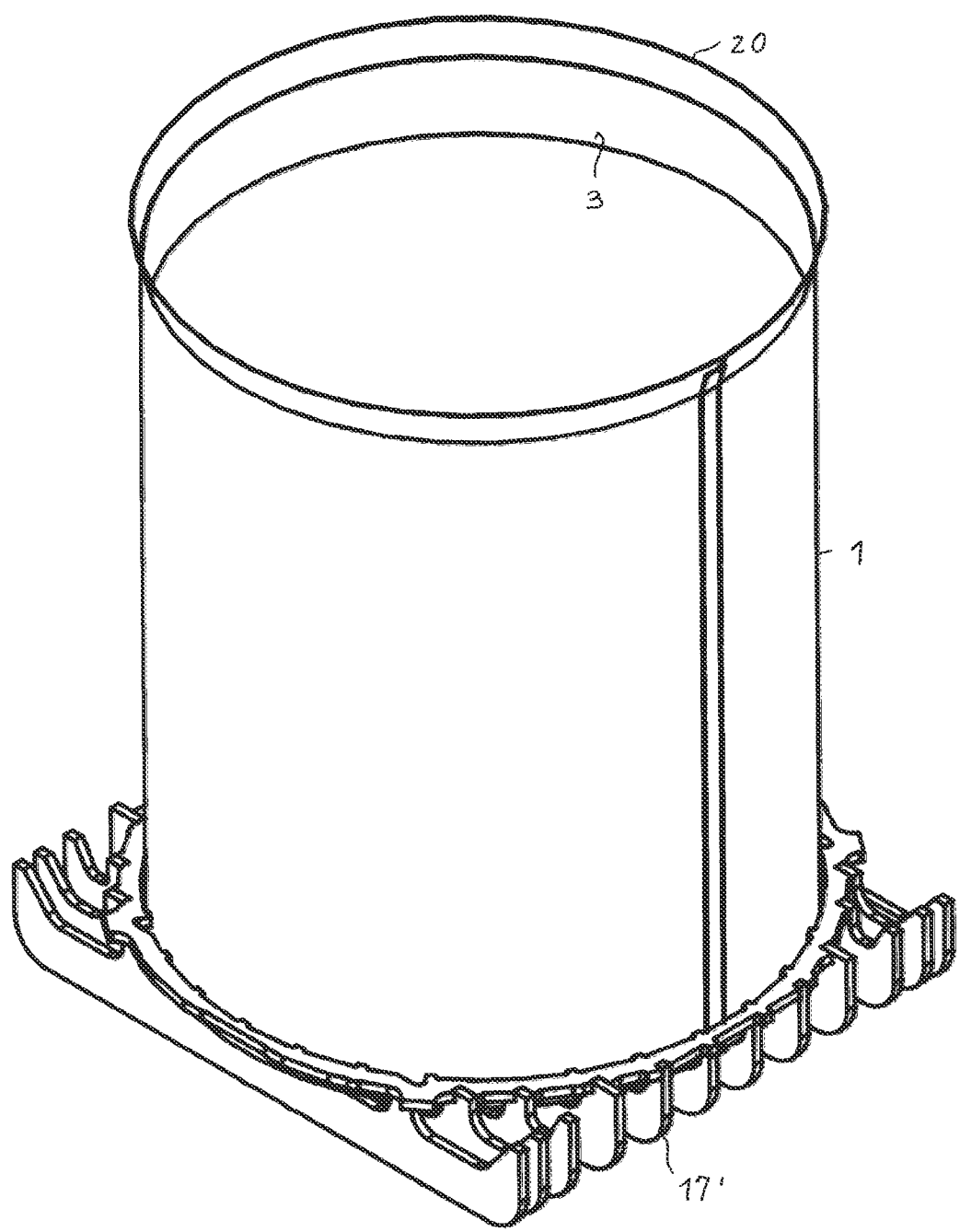
FIG. 7: shows a further embodiment of a round cheese mould.

In another variation, the ribs may also be arranged parallel to each other as longitudinal ribs 17' (FIG. 7), similarly to longitudinal ribs 17 in rectangular cheese moulds 12, and in this case do not have any ring-like ribs.

Rectangular moulds 12 have longitudinal and jacket ribs 17, 18, which are preferably arranged parallel to each other, wherein further longitudinal and jacket ribs 17, 18, which are also arranged parallel to each other, are provided transversely thereto.

Jacket ribs 18 may extend as far as a basket 19 that forms the upper edge of jacket 16. However, rectangular mould 12 may also be formed without basket 19.

In the case of both round and angular moulds 1, 12, the ribs may be connected to the jacket and the base by spot welding. To this end, the ribs then have projecting lugs, and spot welding is carried out at each lug. Despite the integral base and jacket, the moulds have high strength, particularly for absorbing the pressing forces.

The individual moulds 1, 12 are arranged in a manner known per se in the base area.

The ribs are dimensioned such that the outer dimensions of existing cassettes do not need to be changed to accommodate moulds.

The individual moulds 1 are arranged in the base area of cassettes in a manner known per se. A cassette consists of at least one frame, which is constructed from struts, on which drive centring pins for holding and turning the cassette and centring pins for the trough and/or the tenter frame are provided.

At least the jacket 4, 16 of the cheese mould consists of a perforated plate. The perforations must satisfy the condition that the outflow of whey must be less than the inflow of raw cheese mass. This is the only way to ensure that the curds are always below the surface of the whey. Only in this manner can air pockets (blind inclusions) in the cheese be prevented. The apertures in the perforated plate are preferably about 0.1 mm wide and about 0.3 mm long, to prevent hair formation.

For cheese that is to be pressed heavily, i.e. hard cheese, the jacket wall and if necessary also the base consist(s) of a CONIDUR® finely perforated plate. Due to the specific perforation pattern, the formation of "hair", such as occurs in plastic moulds or normal, thicker perforated plates, can be avoided.

For the compression of soft cheese or semi-hard cheese, however, a conventional perforation pattern may be sufficient.

The perforated plate may have a whey edge 20 with a coarser perforation pattern than the rest of jacket 4, 16 above basket 3, particularly for producing hard cheese. A different perforation pattern of jacket 4, 16 is not absolutely necessary for softer cheese.

In general, the cheese moulds may also be made of a plastic.

LIST OF REFERENCE SIGNS

1 Cheese mould
2 Rib structure
3 Basket
4 Jacket
5 Base
7 Longitudinal rib
8 Ring
9 Lengthwise axis
10 Jacket rib
11 Jacket ring
12 Cheese mould
16 Jacket
17 Longitudinal rib
18 Jacket rib
19 Basket
20 Whey edge
21 Press cover
22 Perforated plate
23 Strut
24 Transverse rib, Ring
25 Eyelet
26 Thin bar
30 Frame
31 Ring guide
32 Bolt
33 Outer ring
34 Guide hole
35 Inner ring
36 Sliding surface
37 Guide surface
38 Protrusion

The invention claimed is:

1. Press cover for a cheese mould, particularly for a cheese mould (1, 12) made from metal having a round or polygonal cross section, wherein the press cover (21) matches the inner cross section of the cheese mould (1, 12) in terms of shape and dimensions,
wherein the press cover comprises a perforated plate (22) and a frame (30) is provided on the periphery of the press cover (21), on the outer side of which frame a movable outer ring (33) is disposed, that lies flush against the inner wall of the cheese mould (1, 12), forming a seal therewith, when the raw cheese mass is being pressed out, and wherein the press cover (21) is provided with a strengthening frame and rib structure (23, 24, 30), wherein the outer ring (3) is disposed such that it can be raised and lowered in a guide on a ring guide (31) of the frame (30), wherein a guide surface (37) facing the outer ring (33) is provided on the ring guide (31) at an angle to the pressing direction, and wherein the outer ring (33) is furnished with a matching surface (36) at the same angle as the guide surface (37).

2. Press cover according to claim 1, wherein the outer ring (33) is made from a plastic.

3. Press cover according to claim 1, wherein a protrusion (38) is present on the periphery of the outer ring (33).

4. Press cover according to claim 1, wherein the rib structure (23, 24) includes ribs in the form of struts (23) that pass across the centre point, preferably in radiating or radial manner, originating from the lengthwise axis of the cheese mould (1, 12) and extend via the perforated plate (22) as far as the frame (30), and in so doing intersect with rings or transverse ribs (24) arranged in a ring pattern and attached thereto at the intersection points, wherein a plurality of rings having different diameters and located at a distance from each other is created thereby.

5. Press cover according to claim 1, wherein the perforated plate (22) is preferably a finely perforated plate, and wherein the rib structure (23, 24) is made from a stainless steel.

6. Press cover according to claim 1, wherein the rib structure (23, 24) is joined non-detachably to the perforated plate (22) via thin bars (26).

7. Press cover according to claim 1, wherein the cheese mould (1, 12) has a base and a jacket (4, 16), wherein the base has a rib structure that extends as far as a transition area of the outer jacket wall, and that the cheese mould (1, 12) may have a round or cylindrical or polygonal cross section.

8. Press cover according to claim 1, wherein the cheese mould (1, 12) is made from plastic or metal, preferably a stainless steel.

* * * * *